United States Patent
Holyoake et al.

(10) Patent No.: US 11,521,448 B2
(45) Date of Patent: Dec. 6, 2022

(54) INTELLIGENT DATACENTER FLOOR ACCESS

(71) Applicant: INTERNATIONAL BUSINESS MACHINES CORPORATION, Armonk, NY (US)

(72) Inventors: Colin Ian Holyoake, Braishfield (GB); Michael James Bettle-Shaffer, Winchester (GB); Graham Jon Eames, Winchester (GB); Maurice Francis Gray, Whitchurch (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/180,327

(22) Filed: Feb. 19, 2021

(65) Prior Publication Data

US 2022/0270422 A1   Aug. 25, 2022

(51) Int. Cl.
*G07C 9/23* (2020.01)
*G07C 9/00* (2020.01)
*G06K 19/07* (2006.01)
*G06F 21/35* (2013.01)

(52) U.S. Cl.
CPC .............. *G07C 9/23* (2020.01); *G06F 21/35* (2013.01); *G06K 19/0723* (2013.01); *G07C 9/00309* (2013.01); *G07C 2009/00777* (2013.01)

(58) Field of Classification Search
CPC .......... G07C 9/23; G07C 9/00309; G07C 2009/00777; G06F 21/35; G06K 19/0723
See application file for complete search history.

(56) References Cited

U.S. PATENT DOCUMENTS

| | | | |
|---|---|---|---|
| 9,392,733 B2 | 7/2016 | Day | |
| 10,075,332 B2 | 9/2018 | Palmer et al. | |
| 2013/0154441 A1* | 6/2013 | Redmond | G08G 1/02 235/492 |
| 2015/0113883 A1 | 4/2015 | Wang et al. | |

FOREIGN PATENT DOCUMENTS

WO    2014025043    2/2014

OTHER PUBLICATIONS

Disclosed Anonymously, "Data Center Smart Tile", IP.com, Mar. 18, 2015, 7 pages.
Unknown, "Lockable access covers", https://www.structuralscience.net/benefits/lockable-access-covers/, downloaded Feb. 19, 2021, 2 pages.
Unknown, "Electronic lock based Management System for Intelligent Manhole Cover", http://www.morechanceeiot.com/wulianwangyingyong/electronic-lock-based-management-system-for-intelligent.html, downloaded Feb. 19, 2021, 6 pages.

* cited by examiner

*Primary Examiner* — Matthew Mikels
(74) *Attorney, Agent, or Firm* — Scott Dobson; Andrew D. Wright; Roberts Calderon Safran & Cole, P.C.

(57) ABSTRACT

A method includes: reading, by a tile lifter, a radio-frequency identification (RFID) tag within a floor tile that is locked to a support structure; comparing, by the tile lifter, a personal identification number (PIN) of the RFID tag to an access code within the tile lifter; determining, by the tile lifter, a match between the PIN of the RFID tag and the access code; and actuating, by the tile lifter and in response to the determining the match, an actuator in the floor tile.

20 Claims, 2 Drawing Sheets

INTELLIGENT DATACENTER FLOOR ACCESS

BACKGROUND

Aspects of the present invention relate generally to datacenters and, more particularly, to intelligent datacenter floor access.

A datacenter is a resource for business operations by hosting business systems.

Generally, these business systems are on raised floors within the datacenter. Lifting floor tiles of a raised floor provides access to business system infrastructure underneath the floor tiles.

SUMMARY

In a first aspect of the invention, there is a method including: reading, by a tile lifter, a radio-frequency identification (RFID) tag within a floor tile that is locked to a support structure; comparing, by the tile lifter, a personal identification number (PIN) of the RFID tag to an access code within the tile lifter; determining, by the tile lifter, a match between the PIN of the RFID tag and the access code; and actuating, by the tile lifter and in response to the determining the match, an actuator in the floor tile.

In another aspect of the invention, there is a computer program product including one or more computer readable storage media having program instructions collectively stored on the one or more computer readable storage media. The program instructions are executable to: read, by a tile lifter, a first radio-frequency identification (RFID) tag within a first floor tile; compare, by the tile lifter, a PIN of the first RFID tag to an access code within an access control list within the tile lifter; determine, by the tile lifter, a non-match between the PIN of the first RFID tag and the access code; read, by the tile lifter, a second RFID tag within a second floor tile; compare, by the tile lifter, a PIN of the second RFID tag to the access code; determine, by the tile lifter, a match between the PIN of the second RFID tag and the access code; and actuate, by the tile lifter and in response to the determining the match, an actuator in the second floor tile.

In another aspect of the invention, there is system including: a floor containing plural floor tiles, each of the plural floor tiles including a respective RFID tag having one or more personal identification numbers (PINs); a tile lifter with RFID tag readers configured to read the PINs; an access control device which compares the PINs to access codes; and a locking system that unlocks a respective one of the plural floor tiles from the floor in response to an induction current generated by the tile lifter, the tile lifter generating the induction current based on determining a match between one of the PINs and the access codes.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
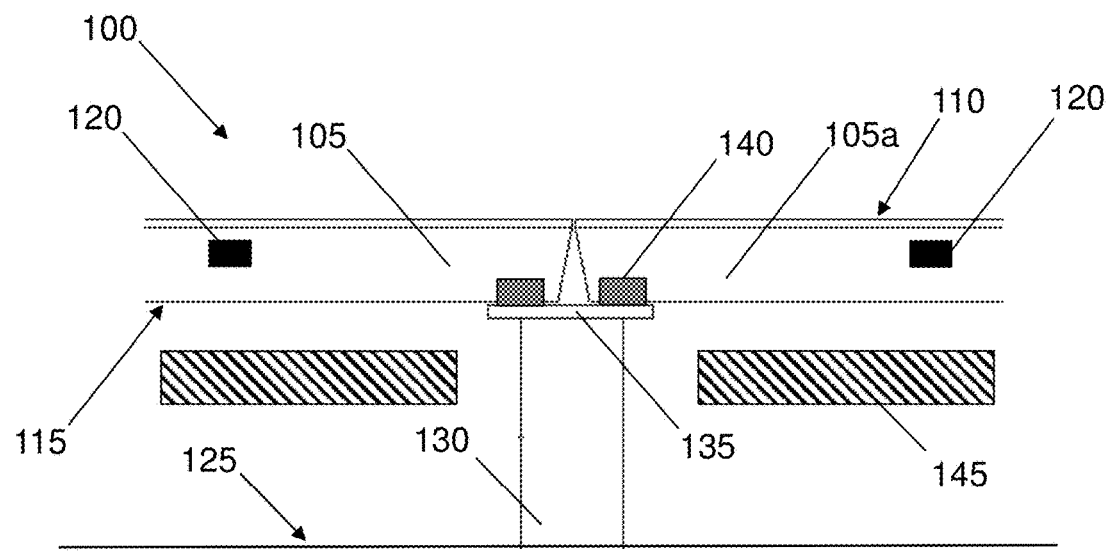
FIG. 1 depicts an intelligent datacenter floor in accordance with aspects of the invention.

Aspects of the present invention relate generally to datacenters and, more particularly, to intelligent datacenter floor access. According to aspects of the invention, an intelligent datacenter floor system within a datacenter uses an electronic access and locking system to secure and unsecure datacenter floor tiles covering business system infrastructure. In embodiments, an intelligent datacenter floor access includes securing the floor tiles at a point where each floor tile rests on an underfloor stanchion or an interlocking stringer. In further embodiments, each floor tile has a radio-frequency identification (RFID) tag. Based on matching the RFID tag with a tile lifter, the system unlocks the floor tile from the floor such that a user (e.g., engineer, technician, etc.) is able to lift that particular floor tile. Alternatively, based on a mismatch between the RFID in the floor tile and that of the tile lifter, the tile lifter does not unlock the floor tile from the floor, which prevents the user from lifting that particular tile. In this manner, implementations of the invention prevent an unauthorized lifting of datacenter floor tiles, thereby protecting the business system infrastructure underneath the floor tiles.

Lifting floor tiles within a datacenter occurs by either hand or by a tile lifter. Accordingly, stopping anyone from unauthorized lifting of a floor tile and accessing the underlying business system infrastructure has challenges. Unauthorized lifting of the floor tiles puts integrity of services and safety of users of the datacenter at risk. Additionally, providing access control to particular users also has challenges. Specifically, it is desirable for a particular user to be able to lift particular floor tiles that are suitable to them. As an example, a network engineer should only be able to lift tiles in a zone where network devices exist. However, there is no prevention of users from lifting floor tiles which are unsuitable to them.

Embodiments of the present disclosure provide floor tiles for forming a datacenter floor. In embodiments, each floor tile includes a latch movable between extended and retracted positions for engaging a complementary formation in a tile support. In embodiments, the extended position of the latch locks the floor tile in situ within the datacenter floor. In further embodiments, retracting the latch into the retracted position releases the floor tile from the tile support. In one example, biasing of the latch urges the latch into the retracted position. Additionally, a cocking mechanism moves the latch against the biasing into the extended position as the floor tile is located onto the tile support. In embodiments, an electrically releasable catch releasably holds the latch in the extended position and releases the latch for movement to the retracted position by biasing the latch in response to receiving a coded electrical signal.

Implementations of the invention allow for improvements to computer business systems by limiting access to the business system infrastructure serving the computer business systems. In embodiments, an electronic access and locking system secures a floor tile at a point where the floor tile rests on underfloor stanchions or an interlocking stringer of a raised datacenter floor. In further embodiments, each floor tile contains an RFID tag which is in communication with the electronic access and locking system. A tile lifter for lifting the floor tiles includes at least one RFID tag reader and a power source. In embodiments, the tile lifter has appropriate access codes storing which match a personal identification number (PIN) of the RFID tags within the floor tiles, thereby allowing access to the business system infrastructure underneath the floor tile. In this way, aspects of the invention prevent a tile lifter from lifting any tile within the datacenter without the appropriate access code. Accordingly, implementations of the invention provide for the practical application of preventing the unauthorized lifting of datacenter floor tiles, thereby protecting the business system infrastructure underneath the floor tiles and improving the security of the computer business systems.

It should be understood that, to the extent implementations of the invention collect, store, or employ personal information provided by, or obtained from, individuals (for example, user identification), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

FIG. 1 shows an intelligent datacenter floor 100 within a datacenter in accordance with aspects of the invention. In embodiments, a datacenter is a facility which hosts business systems. Examples of business systems include computer systems and computer system components such as servers, routers, switches, firewalls, storage systems, and other computer devices that store and/or manage business data and/or applications.

In embodiments, the intelligent datacenter floor 100 includes floor tiles 105, 105a which form the intelligent datacenter floor 100. As shown in FIG. 1, the floor tiles 105, 105a have a top surface 110 and a bottom surface 115 and are made from various materials, e.g., compressed wood between metal layers which maintain compression of the compressed wood. In embodiments, the top surface 110 of the floor tiles 105, 105a is made from a vinyl material covering the metal layer, this being an exemplary construction and not limiting. In further embodiments, the floor tiles 105, 105a are adjacent to one another, thereby forming an angled space between the floor tiles 105, 105a.

In embodiments, a radio-frequency identification (RFID) RFID tag 120 is within each of the floor tiles 105, 105a. In an embodiment, the RFID tag 120 is between the top surface 110 and the bottom surface 115 of the floor tiles 105, 105a. In further embodiments, the RFID tag 120 is within any location of the floor tiles 105, 105a which allows for reading of the RFID tag 120 by an RFID reader. As an example, the RFID tag 120 is within the compressed wood material of the floor tiles 105, 105a. In embodiments, the RFID tag 120 is at a center of the floor tiles 105, 105a when viewed from the top of the floor tile, to avoid cross-contamination of signals between a signal coming from the RFID tag 120 within the floor tile 105 and a signal coming from the RFID tag 120 within the floor tile 105a. Examples of the RFID tag 120 include an active or passive RFID tag, amongst other examples.

In embodiments, the RFID tag 120 is a device which contains an integrated circuit and an antenna, for storage and transmission of data between the RFID tag 120 and an RFID reader. In embodiments, the data within the RFID tag 120 includes personal identification numbers (PINs) allowing for permanent or temporary access to a business system infrastructure 145 underneath the floor tiles 105, 105a. In further embodiments, the PIN within the RFID tag 120 matches a PIN of an access code of a particular user who has authorization to lift the floor tiles 105, 105a.

In embodiments, each of the tiles 105, 105a is identical to one another except for the PIN stored in their respective RFID tag 120. In embodiments, the number of tiles 105, 105a is not limited to two. Instead, there may be any desired number of tiles 105, 105a arranged together in any desired pattern to make the intelligent datacenter floor 100.

In embodiments, a stanchion 130 supports the floor tiles 105, 105a. As shown in FIG. 1, the stanchion 130 extends from a floor 125 for raising the floor tiles 105, 105a above the floor 125. In embodiments, the stanchion 130 is any structure which supports the floor tiles 105, 105a above the floor 125, e.g., a beam. In an example, the stanchion 130 is made from a metal material, amongst other examples.

In embodiments, a stanchion head 135 of the stanchion 130 supports the floor tiles 105, 105a above the floor 125. In an example, the stanchion head 135 is made from the same material as the stanchion 130. Alternatively, the stanchion head 135 is made from a different material than the stanchion 130. In this way, a support structure for the floor tiles 105, 105a includes the stanchion 130 and stanchion head 135.

In embodiments, a locating lug 140 extends from the stanchion head 135 of the support structure. In an example, the locating lug 140 is made from the same material as the stanchion 130 and the stanchion head 135. In embodiments, the locating lug 140 holds the floor tiles 105, 105a in place with respect to the stanchion head 135 by extending into the bottom surface 115 of the floor tiles 105, 105a. In an example, the lifting of the floor tile 105 does not lift the adjacent floor tile 105a because the locating lug 140 continues to hold the floor tile 105a in place with respect to the stanchion head 135. In this way, the locating lug 140 is part of the support structure and secures the floor tiles 105, 105a at a point where the floor tiles 105, 105a rest on the stanchion 130, i.e., the stanchion head 135.

In embodiments, business system infrastructure 145 is underneath the floor tiles 105, 105a. In embodiments, the business system infrastructure 145 serves the business systems within the datacenter. Examples of business system infrastructure 145 include cabling, power connections, fiber optics, and Ethernet fiber, amongst other examples. In embodiments, lifting of the floor tiles 105, 105a provides access to the business system infrastructure 145.

Figure 2:
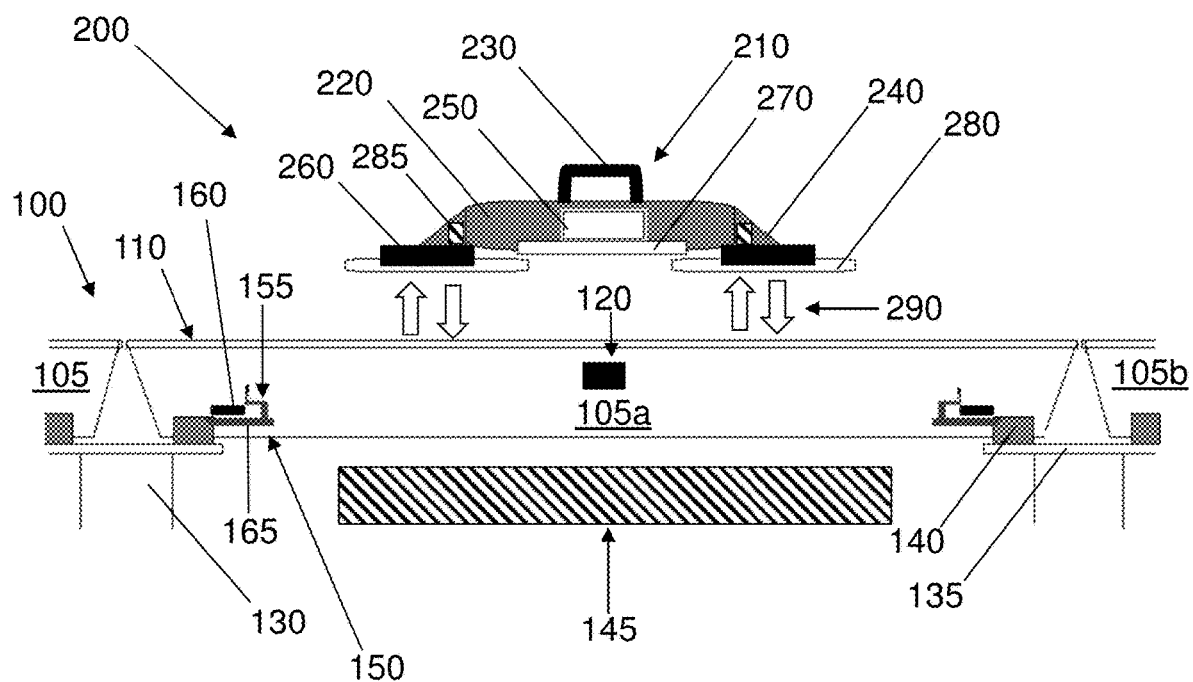
FIG. 2 depicts an intelligent datacenter floor system in accordance with aspects of the invention.

FIG. 2 shows an intelligent datacenter floor system 200 in accordance with aspects of the invention. In embodiments, the intelligent datacenter floor system 200 provides selective access to the business system infrastructure 145 underneath the intelligent datacenter floor 100. This selective floor access prevents unauthorized access to the business system infrastructure 145 by preventing the lifting of datacenter floor tiles 105, 105a, 105b without appropriate authorization, thereby preserving the integrity of services and safety of users within the datacenter.

In embodiments, a user utilizes a tile lifter 210 to lift the floor tile 105a for access to the business system infrastructure 145 underneath the floor tile 105a. As shown in FIG. 2, the tile lifter 210 includes a body 220 and a handle 230 for controlling operation of the tile lifter 210. For example, a user grabs the handle 230 to physically control the tile lifter 210 for lifting floor tiles 105, 105a, 105b. In a further example, placement of the tile lifter 210 is with respect to a center of each of the floor tiles 105, 105a, 105b to distribute the weight of the floor tile 105a across the tile lifter 210 when lifting. In this way, a center placement of the RFID tag 120 within each of the floor tiles 105, 105a, 105b allows for relatively easier reading of the RFID tag 120 by RFID tag readers 260 of the tile lifter 210 because of the center placement of the tile lifter 210 when lifting any of the floor tiles 105, 105a, 105b. In embodiments, arms 240 extend from the body 220 of the tile lifter 210. In an example, the tile lifter 210, including the body 220, the handle 230, and the arms 240, are made from a plastic material, amongst other examples.

In embodiments, a power source 250 is within the body 220 of the tile lifter 210. In an example, the power source 250 is a portable battery, amongst other examples. In embodiments, the power source 250 powers RFID tag readers 260 of the tile lifter 210 for reading of the RFID tags 120 within a tile of the floor tiles 105, 105a, 105b. In an example, the RFID tag readers 260 are located at or in the arms 240 of the tile lifter 210, amongst other examples. In further embodiments, the power source 250 powers an access control device 270 that is programmed to perform functions described herein. In even further embodiments, the power source 250 supplies power to an induction current device 285 for generating an induction current 290 that is selectively applied to a locking system 150 within any one of the floor tiles 105, 105a, 105b.

In embodiments, the RFID tag readers 260 read a PIN within the RFID tag 120. In further embodiments, the user places the tile lifter 210 with respect to the floor tiles 105, 105a, 105b to allow the RFID tag readers 260 to read the PINs within the RFID tag 120. As an example, the user places the tile lifter 210 onto the top surface 110 of the floor tile 105a such that there is a relatively short distance between the RFID tag readers 260 and the RFID tag 120, e.g., less than 10 centimeters distance between the RFID tag readers 260 and the RFID tag 120, amongst other distances.

In embodiments, suction cups 280 also extend from the arms 240. In embodiments, the suction cups 280 allow for lifting of the floor tiles 105, 105a, 105b by forming a seal with respect to the top surface 110 of the floor tiles 105, 105a, 105b. In further embodiments, the RFID tag readers 260 are in a position with respect to the arms 240 and suction cups 280 which allows the RFID tag readers 260 to read the PINs within the RFID tag 120, while allowing the suction cups 280 to form the seal against the top surface 110 of any of the floor tiles 105, 105a, 105b.

In embodiments, the access control device 270 of the tile lifter 210 stores an access control list in a memory. In embodiments, the access control device 270 comprises a computer memory configured to store data (e.g., an access control list) and/or program instructions (e.g., computer readable program instructions for carrying out operations of the present invention). In embodiments, the access control device 270 also includes electronic circuitry including, for example, one or more of programmable logic circuitry, a computer processor, a field-programmable gate array (FPGA), and an application-specific integrated circuit (ASIC), the electronic circuitry being configured to execute the computer readable program instructions to perform one or more functions described herein (e.g., comparing data, controlling an induction current device, etc.). Examples of data include the access control list. Examples of instructions include communicating with the RFID tag readers 260 and supplying power from the power source 250. In embodiments, the access control list contains access codes having the PINs of users who have authorization to lift at least one of the floor tiles 105, 105a, 105b. In an example, the tile lifter 210 receives the access code from a user manually entering their PIN into the access control list. In another example, the tile lifter 210 receives the access code from an administrator entering the PIN into the access control list.

In embodiments, the access control device 270 communicates with the RFID tag readers 260 for determining whether there is a match of the PIN of the RFID tag 120 with the PINs of users within the access codes of the access control list. In an example, the RFID tag readers 260 read a PIN within the RFID tag 120 of the floor tile 105a.

In embodiments, the access control device 270 determines whether there is a match between the PIN within the RFID tag 120 and the PIN of the user within an access code of the access control list. As an example, the access control device 270 retrieves the PIN of the RFID tag 120 from the RFID tag readers 260 and retrieves the PINs from the memory storing the access control list having access codes. In view of a determination of a match between the PIN within the RFID tag 120 and the PIN of the user within an access code of the access control list, the access control device 270 determines that the user has authorization to lift the floor tile 105a. Alternatively, in view of a non-match between the PIN of the RFID tag 120 and the PIN of the user within the access code of the access control list, the access control device 270 determines that the user does not have authorization to lift the floor tile 105a. In this way, aspects of the invention compare the access control list to the PIN within the RFID tag 120 and maintains the floor tile 105a in a locked state relative to the stanchion 130 in response to the non-match determination. As an example, the user presents the tile lifter 210 to a first floor tile, e.g., tile 105, for a first reading. In this example, the user does not have the appropriate access code for the first floor tile. The access control device 270 determines that the user does not have authorization to lift the first floor tile, and the first floor tile remains secure. Continuing with this example, the user presents the tile lifter 210 to a second floor tile, e.g., tile 105a, for a second reading. In this example, the user does have the appropriate access code for the second floor tile and the tile lifter 210 releases (e.g., unlocks) the second floor tile in response to the second reading and determining a match between the PIN within the RFID tag 120 of the second floor tile and the PIN of the user.

In embodiments, the combination of the tile lifter 210 and the locking system 150 controls which floor tiles 105, 105a, 105b the user has authorization to lift. This ensures that a user, such as a datacenter engineer, is unable to lift floor tiles 105, 105a, 105b in zones for which they do not have authorization. In an example, a first engineer has authorization for access to the business system infrastructure 145 within zones 1 and 2 which house test servers as the business systems. In another example, a second engineer has access to the business system infrastructure 145 within zones 1, 3, and 4 which house test and production servers as the business systems. In another example, a third engineer has access to the business system infrastructure 145 within zone 5 which houses only network cores and distribution systems as business systems. In yet another example, a fourth engineer is a main datacenter manager and therefore has full access to all of the business system infrastructure 145 within the datacenter. In a further example, a fifth engineer has no access authorization to the business system infrastructure 145 within the datacenter. In view of these examples, the third engineer is unable to access the business system infrastructure 145 in zones 1 and 2, while the fifth engineer is unable to access any business system infrastructure 145 within the datacenter.

In embodiments, in response to determining a match between the PIN within the RFID tag 120 and the PIN of the user by the access control device 270, the tile lifter 210 generates an induction current 290 that is wirelessly applied to a locking system 150 within any one of the floor tiles 105, 105a, 105b the user has authorization for, e.g., floor tile 105a. As an example, an induction current device 285 is electrically connected to the power supply 250 and is controlled by the access control device 270 to selectively generate an induction current that emanates from the tile lifter 210. In embodiments, the access control device 270 actuates the induction current device 285 in response to determining a match between the PIN within the RFID tag 120 to the PIN of the user. In this way, the access control device 270 controls the induction current device 285 to generate the induction current 290 that unlocks one of the floor tiles from the floor. In embodiments, the induction current device 285 includes a generator that generates an electromagnetic field that extends primarily outward and downward from the tile lifter 210, such that the electromagnetic field, when generated, is directed toward a floor tile on which the tile lifter 210 sits. In this way, the induction current device 285 sends the induction current 290 to the locking system 150.

In embodiments, the locking system 150 includes an actuator 155, a lock 160, and a spring 165 all within any one of the floor tiles 105, 105a, 105b. In an example, the lock 160 is a magnetic lock. In another example, the lock 160 is a latch that is controlled by the actuator 155 to be in one of a first position (e.g., extended) and a second position (e.g., retracted). In embodiments, the latch engages the locating lug 140 when the latch is in the first position (thereby locking the floor tile to the floor), and the latch is disengaged from the locating lug 140 when the latch is in the second position (thereby unlocking the floor tile from the floor). In embodiments, the lock 160 secures the floor tiles 105, 105a, 105b into the locating lug 140 on the stanchion head 135 of the stanchion 130. In further embodiments, actuation of the actuator 155 by the induction current 290 pulls the spring 165 back, which retracts the lock 160 and therefore releases the floor tile 105a from the stanchion head 135. In this way, the induction current 290 actuates the actuator to unlock the floor tile from the support structure that includes the stanchion 130 and the stanchion head 135. In an example, the induction current 290 actuates the actuator 155 to pull back the spring 165, thereby retracting the lock 160 and releasing the floor tile 105a from the stanchion head 135 to allow lifting by the user having authorization to lift the floor tile 105a.

In an exemplary method of using the tile lifter 210, a user places the tile lifter 210 on the top surface 110 of the floor tile 105a. In this example, the suction cups 280 of the tile lifter 210 form a seal between the suctions cups 280 and the top surface 110 of the floor tile 105a. In this example, the user places the tile lifter 210 at a center of the floor tile 105a to distribute the weight of the floor tile 105a across the tile lifter 210. In this example, the RFID tag readers 260 read the PINs within the RFID tag 120, with the access control device 270 determining there is a match between the PIN within the RFID tag 120 and the PIN of the user. In response to the determined match, the access control device 270 controls the induction current device 285 to generate the induction current 290, which actuates the actuator 155 and retracts the lock 160. In this way, the user lifts the floor tile 105a once the seal forms between the suctions cups 280 and the top surface 110 of the floor tile 105a in response to determining a match and retracting the lock 160.

In embodiments, upon removal of the induction current 290 by the user removing the tile lifter 210 from the floor tile 105a and thereby creating a distance which prevents the actuator 155 from receiving the induction current, the actuator 155 releases the spring 165, which causes the spring 165 to load (e.g., extend) the lock 160 into the locating lug 140. In an example, upon finishing access to the business system infrastructure 145 underneath the floor tile 105a, the user returns the floor tile 105a back onto the stanchion head 135. The user then removes the tile lifter 210 from the floor tile 105a by breaking the seal between the suction cups 280 and the top surface 110 of the floor tile 105a so that the actuator 155 no longer receives the induction current. In this way, removing the tile lifter 210 from the floor tile 105a removes the induction current 290 from the locking system 150 of the floor tile 105a. In response to removal of the induction current 290, the actuator 155 releases the spring 165, which subsequently loads the lock 160 into the locating lug 140, thereby securing the floor tile 105a. Accordingly, aspects of the invention discontinue the induction current 290 when the tile lifter 210 is removed from the floor tile 105a, and discontinuing the induction current 290 causes the actuator 155 to extend a lock 160 to a locking position.

Figure 3:
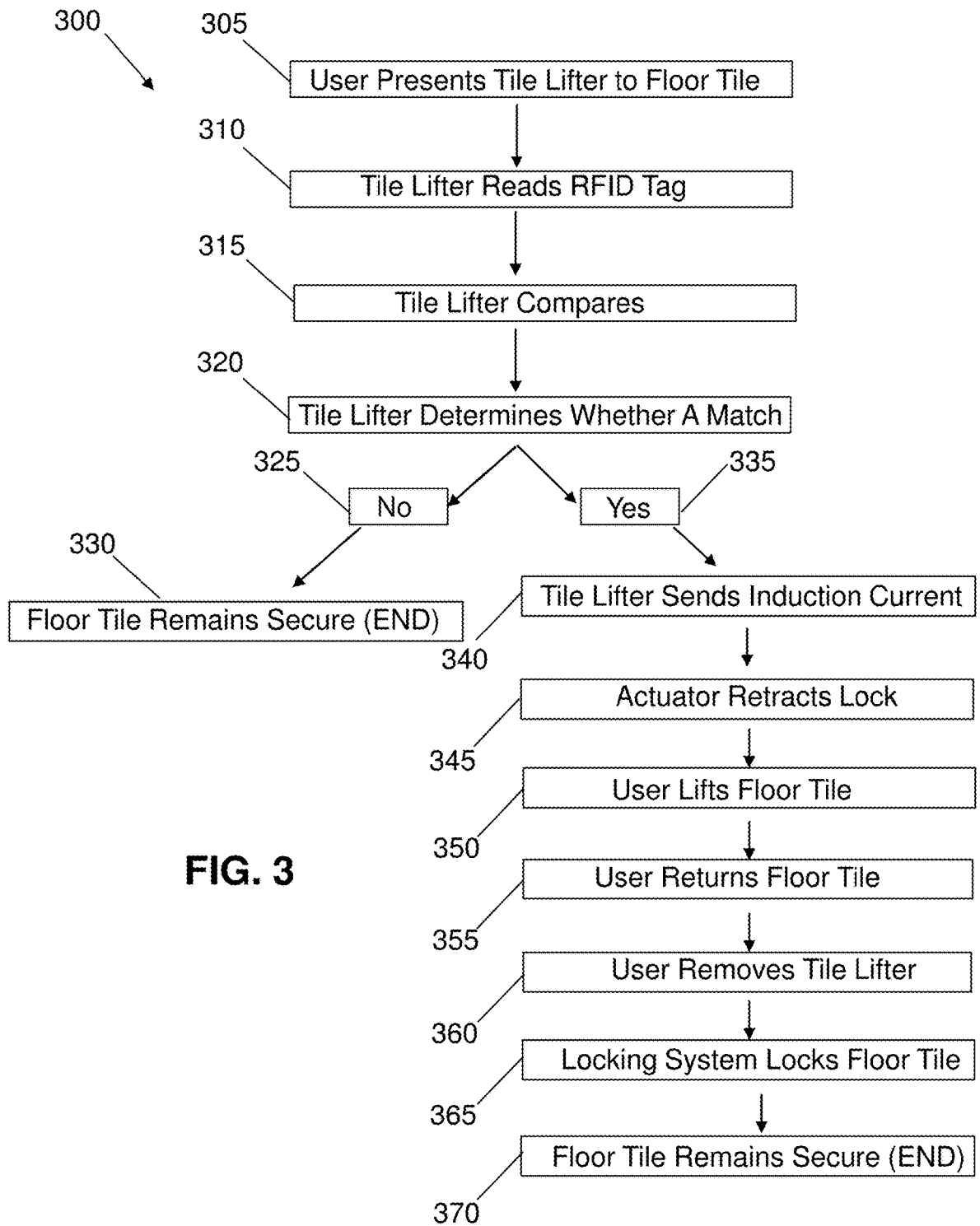
FIG. 3 shows a flowchart of an exemplary method in accordance with aspects of the invention.

FIG. 3 shows a flowchart 300 of an exemplary method in accordance with aspects of the present invention.

At step 305, a user presents the tile lifter 210 to a floor tile of the floor tiles 105, 105a, 105b. In embodiments, and as described with respect to FIGS. 1 and 2, the user utilizes the handle 230 of the tile lifter 210 to place the tile lifter 210 on a surface of a floor tile of the floor tiles 105, 105a, 105b, e.g., floor tile 105a.

At step 310, the tile lifter 210 reads the RFID tag 120 within the floor tile 105a. In embodiments, and as described with respect to FIGS. 1 and 2, the RFID tag readers 260 read the RFID tag 120. In embodiments, the RFID tag readers 260 read a PIN within the RFID tag 120.

At step 315, the tile lifter 210 compares the PINs within access codes of the access control list (ACL) to a PIN of the RFID tag 120 of the floor tile 105a. In embodiments, and as described with respect to FIGS. 1 and 2, the access control device 270 of the tile lifter 210 performs the comparison. In embodiments, the access control device 270 retrieves the PIN of the RFID tag 120 from the RFID tag readers 260 and retrieves the PINs from the memory storing the ACL having access codes for the comparison.

At step 320, the tile lifter 270 determines whether there is a match between the PIN of the RFID tag 120 and a PIN of an access code of the ACL. In embodiments, and as described with respect to FIGS. 1 and 2, this determination of matching occurs by the access control device 270 comparing the PIN of the RFID tag 120 to the PINs of users within the ACL.

At step 325, there is no match between a PIN of an access code to the PIN of the RFID tag 120. In embodiments, and as described with respect to FIGS. 1 and 2, this non-matching causes the floor tile 105a to remain secure with respect to the stanchion head 135 of the stanchion 130. Accordingly, the process ends at step 330.

At step 335, there is a match of the PIN within an access code of the ACL to the PIN of the RFID tag 120. In embodiments, and as described with respect to FIGS. 1 and 2, this matching occurs between the PIN of the RFID tag 120 to the PINs of access codes of users within the ACL.

At step 340, the tile lifter 210 sends an induction current 290 to the floor tile 105a in view of the matching PIN. In embodiments, and as described with respect to FIGS. 1 and 2, the access control device 270 controls the induction current device 285 to cause the induction current device 285 to generate the induction current 290, which is wirelessly emanated to the locking system 150 of the floor tile 105a as an electromagnetic field.

At step 345, the actuator 155 retracts the lock 160. In embodiments, and as described with respect to FIGS. 1 and 2, the induction current 290 actuates the actuator 155 to pull back the spring 165, thereby retracting the lock 160 of the locking system 150, thereby releasing the floor tile 105a from the stanchion head 135.

At step 350, the user lifts the floor tile 105a using the tile lifter 210. In embodiments, and as described with respect to FIGS. 1 and 2, the suction cups 280 of the tile lifter 210 form a seal between the suctions cups 280 and the top surface 110 of the floor tile 105a. The user lifts the floor tile 105a upon forming of the seal.

At step 355, the user returns the floor tile 105a using the tile lifter 210. In embodiments, and as described with respect to FIGS. 1 and 2, upon finishing access to the business system infrastructure 145 underneath the floor tile 105a, the user returns the floor tile 105a back onto the stanchion head 135.

At step 360, the user removes the tile lifter 210 from the floor tile 105a. In embodiments, and as described with respect to FIGS. 1 and 2, the user removes the tile lifter 210 from the floor tile 105a by breaking the seal between the suction cups 280 and the top surface 110 of the floor tile 105a.

At step 365, the locking system 150 locks the floor tile 105a to the stanchion head 135. In embodiments, and as described with respect to FIGS. 1 and 2, in response to removing the induction current 290 by removing the tile lifter 210, the actuator 155 releases the spring 165 to load the lock 160 into the locating lug 140, thereby securing the floor tile 105a to the stanchion head 135.

At step 370, the floor tile 105a remains secure to the stanchion head 135. In embodiments, and as described with respect to FIGS. 1 and 2, lock 160 secures the floor tile 105a into the locating lug 140, thereby securing the floor tile 105a to the stanchion head 135 of the stanchion 130. Accordingly, the process now ends at step 370.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
reading, by a tile lifter, a radio-frequency identification (RFID) tag within a floor tile that is locked to a support structure;
comparing, by the tile lifter, a personal identification number (PIN) of the RFID tag to an access code within the tile lifter;
determining, by the tile lifter, a match between the PIN of the RFID tag and the access code; and
actuating, by the tile lifter and in response to the determining the match, an actuator in the floor tile.

2. The method of claim 1, wherein the actuating comprises the tile lifter generating an induction current that actuates the actuator in the floor tile.

3. The method of claim 2, wherein the actuating the actuator unlocks the floor tile from the support structure.

4. The method of claim 2, wherein the induction current actuates the actuator, which retracts a lock from a locating lug.

5. The method of claim 4, wherein:
the lock is comprised in a locking system in the floor tile; and
the locating lug is part of the support structure.

6. The method of claim 2, wherein a seal forms between the tile lifter and the floor tile when the tile lifter is positioned against the floor tile.

7. The method of claim 6, wherein the seal is broken when the tile lifter is removed from the floor tile.

8. The method of claim 7, further comprising discontinuing the induction current when the tile lifter is removed from the floor tile.

9. The method of claim 8, wherein the discontinuing the induction current causes the actuator to extend a lock to a locking position.

10. The method of claim 9, wherein the extending the lock to the locking position locks the floor tile to the support structure.

11. The method of claim 1, further comprising receiving, by the tile lifter, the access code from a user of the tile lifter.

12. The method of claim 1, further comprising receiving, by the tile lifter, the access code from an administrator.

13. A computer program product comprising one or more computer readable storage media having program instructions collectively stored on the one or more computer readable storage media, the program instructions executable to:
read, by a tile lifter, a first radio-frequency identification (RFID) tag within a first floor tile;
compare, by the tile lifter, a PIN of the first RFID tag to an access code within an access control list within the tile lifter;
determine, by the tile lifter, a non-match between the PIN of the first RFID tag and the access code;
read, by the tile lifter, a second RFID tag within a second floor tile;
compare, by the tile lifter, a PIN of the second RFID tag to the access code;
determine, by the tile lifter, a match between the PIN of the second RFID tag and the access code; and
actuate, by the tile lifter and in response to the determining the match, an actuator in the second floor tile.

14. The computer program product of claim 13, wherein the actuating the actuator comprises generating and applying an induction current to the actuator.

15. The computer program product of claim 13, wherein the tile lifter generates the induction current.

16. The computer program product of claim 13, wherein the actuator, in response to the induction current, retracts a latch from a support structure on which the second floor tile is held.

17. A system comprising:
a floor containing plural floor tiles, each of the plural floor tiles including a respective RFID tag having one or more personal identification numbers (PINs);
a tile lifter with RFID tag readers configured to read the PINs;
an access control device which compares the PINs to access codes; and
a locking system that unlocks a respective one of the plural floor tiles from the floor in response to an induction current generated by the tile lifter, the tile lifter generating the induction current based on determining a match between one of the PINs and the access codes.

18. The system of claim 17, wherein the tile lifter does not generate the induction current when there is no match between the PINs and the access codes.

19. The system of claim 18, wherein the locking system includes an actuator that retracts a latch in response to the induction current.

20. The system of claim 19, wherein the latch retracts from a support structure on which the one of the plural floor tiles is held.

* * * * *